A. A. A. DREYFUS & A. H. V. LEVY.
CALCULATING MACHINE.
APPLICATION FILED NOV. 21, 1908.
932,255.
Patented Aug. 24, 1909.
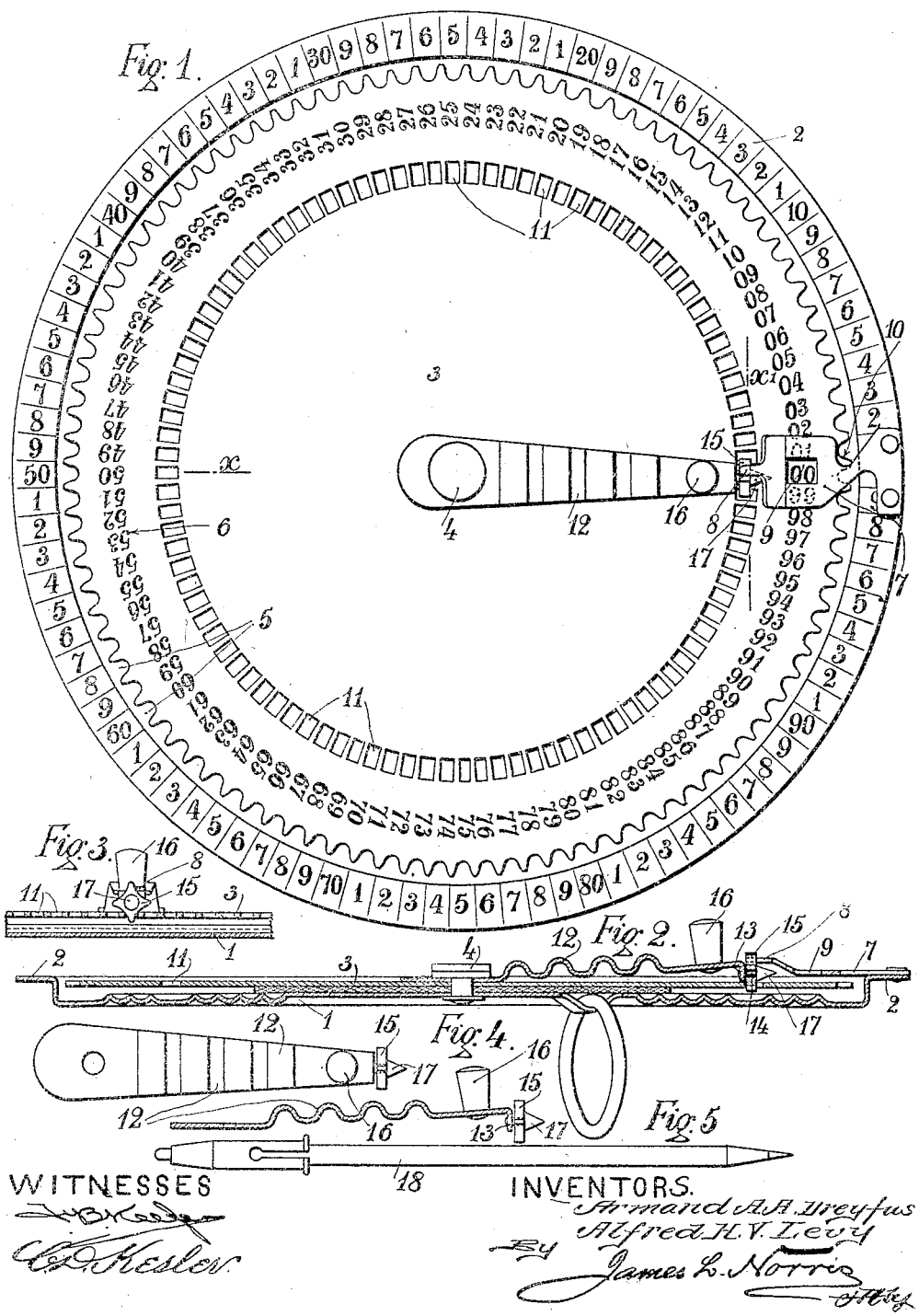
WITNESSES
INVENTORS.
Armand A. A. Dreyfus
Alfred H. V. Levy
By James L. Norris
Atty

UNITED STATES PATENT OFFICE.

ARMAND ALBERT ABRAHAM DREYFUS, OF HANDSWORTH, NEAR BIRMINGHAM, AND ALFRED HENRY VICTOR LÉVY, OF EDGBASTON, BIRMINGHAM, ENGLAND.

CALCULATING-MACHINE.

932,255.  Specification of Letters Patent.  Patented Aug. 24, 1909.

Application filed November 21, 1908. Serial No. 463,821.

*To all whom it may concern:*

Be it known that we, ARMAND ALBERT ABRAHAM DREYFUS and ALFRED HENRY VICTOR LÉVY, subjects of the King of Great Britain, residing at 2 Selbourne road, Handsworth, near Birmingham, England, and White Lodge, 7 Church road, Edgbaston, Birmingham, England, respectively, have invented certain new and useful Improvements in Calculating - Machines, of which the following is a specification.

This invention relates to calculating machines, and has for its object to provide a new and simplified construction of machine for mechanically adding or subtracting any series of figures or numbers.

Figure 1 of the accompanying drawings represents a plan of a calculator constructed in accordance with this invention. Fig. 2 is a section on line $x$ Fig. 1. Fig. 3 represents a section on line $x^1$ Fig. 1. Fig. 4 is a plan and section of the "hundreds" indicator. Fig. 5 represents a suitable form of style which may be used for operating the machine.

The same figures of reference indicate corresponding parts in each of the figures of the drawing.

The base plate 1 has its edge 2 raised as shown, so as to form said plate into a hollow dished shape. Around said edge 2 a continuous series of numbers are marked in series of 10—that is to say, from 1 to 10, 1 to 20, 1 to 30—from 1 up to 100, the latter, however, not being seen owing to being covered by the plate 7 hereafter referred to. Within the hollow interior of said base plate 1, a central disk 3 is arranged, said disk being pivotally mounted at 4 so as to be capable of being freely rotated. The edge of this disk is provided with a series of notches or teeth 5, equal in number to the figures around the edge of the base plate, while near the edge of the disk, and opposite to said notches, is a series of numbers 6, from 1 to 100, the latter being indicated by zero.

Fixed upon the outer edge 2 is a plate 7, which extends over the edge of the rotatable disk 3, and is provided at its outer end with a horizontally projecting tongue 8, the outer end of the plate being bent up as shown, so as to bring said tongue 8 a short distance above the face of said disk 3. In this plate 7 is formed an aperture 9 which comes immediately over the figures 6 on the disk, so as to expose one of the latter therethrough. There is also formed in the said plate, near its inner end, a gap 10 whose inner end comes opposite to the zero mark on the edge 2 of the base 1. Formed in said disk 3 near the figures 6, is a ring of rectangular holes 11, each of which is arranged opposite to one of said figures, and equal in number to the latter.

Pivoted upon the disk 3 at its center 4, is a radial bar 12, whose outer end extends to within a short distance of the edge of said disk. This bar 12 is transversely corrugated as shown, so as to give same a spring construction, while its outer end is bent down at 13, and carries a pin 14, upon which is loosely mounted a star wheel 15, whose bottom tooth or projection engages within one of the holes 11. The tongue 8 of the plate 7 is arranged so that it extends over the holes 11, and in the path traversed by the upper tooth of the wheel 15 when the disk 3 is rotated as hereafter described so that when said disk is so rotated that the bar 12 moves past the tongue 8, the top tooth of said wheel 15 engages with the latter, so that said wheel, in wiping past the tongue, is caused to turn upon the pin 14, and cause the bottom tooth to leave the hole 11 in which it was previously engaged, and the next tooth to enter or snap into the adjacent hole, the bar 12 moving angularly upon the center 4. The spring construction of the bar serves to always insure the star wheel fully engaging with the holes 11.

A knob or handle 16 is provided upon the bar 12 for turning same by hand when required.

The pin 14 is preferably provided at its outer end with a pointed head 17, which points directly from one of the holes 11, and indicates the number to which the particular hole engaged by the star-wheel, corresponds. The bar 12 is capable of being lifted to disengage the star wheel from the holes 11, and of being moved to any position around the disk as required. The operation of the machine is as follows:—

In every case before each operation, the zero mark on the disk 3 must be brought beneath the aperture 9 of the plate 7, and with the star wheel 15 engaging in the zero hole. For the purpose of adding a series of numbers, for instance, 50, 35 and 45, after the machine has been placed in its zero position as above described, a suitable style or the like (such as shown in Fig. 5, and marked 18) is placed in the notch in the disk 3, which is opposite the figure 50 on the outside ring of figures, and brought round into the recess 10 of the plate 7, when the number 50 of the figures 6 will appear beneath the aperture 9. The style is then placed in the notch opposite to the figure 35 of the outside ring, and drawn around as before, the number 85 now appearing beneath the aperture 9. The operation is then repeated with respect to the number 45, the style being placed in the notch opposite this number on the said outside ring, and brought around to the recess 8. This will bring the bar 12 past the plate 7, thereby causing the top tooth of the star wheel to engage with the tongue 8 and cause the latter to turn upon its pin, and to engage with the next hole opposite to the figure 1, and thus indicates that 100 has been added, while the figure 20 appears beneath the aperture 9. The total sum will therefore be 120,-of which 100 is indicated by the star wheel, while the 20 is indicated by the aperture 9. For each extra hundred added, the star wheel moves into another hole, and thus automatically registers same.

In order to subtract two numbers, the figures upon the disk 3 represent the minuend and the numbers upon the outer ring 2 the subtrahend. Thus to subtract 47 from 84, the style is placed in the notch opposite to the figure 84, and moved around until opposite to the number 47 upon the peripheral portion 2, when 37, the difference between the two numbers, will appear beneath the aperture 9. Should the two numbers be, for instance, 129 and 57, the style is placed in the notch opposite to number 29, and turned past the plate 7, being lifted thereover until same comes opposite to number 57 on the outer ring, thus displaying the difference, 72, in the aperture 9. Or for the same example the style may be turned in the opposite and shortest direction to the number 57 to attain the same result and without the necessity of lifting the same over the plate 7. Certain examples may, however, involve the necessity of lifting the style over the plate 7, and this may be very easily and quickly done without substantially interrupting the operation.

By the calculator as shown in the drawings, a total of 9999 can be added.

Having fully described our said invention, what we desire to claim and secure by Letters Patent is:—

1. A calculating machine comprising a base plate marked with a series of numbers, a rotatable disk mounted upon said base plate and having a series of numbers marked around same corresponding to the numbers upon said base plate, said disk having a series of holes formed therein, an indicator device engaging in said holes, and means for engaging with said device once every revolution of the disk so as to cause same to engage with the next adjacent hole, the machine being operated as described.

2. A calculating machine comprising a base plate marked with a series of numbers, a rotatable disk mounted upon said base plate and having a series of numbers marked around same corresponding to the numbers upon the base plate, said disk having an annular series of numbered holes formed therein, an indicator device having means engaging in said holes, and a projecting part carried by the base plate adapted to engage with said means once every revolution of the disk, so as to cause the same to engage with the next adjacent hole, the machine being operated as described.

3. A calculating machine comprising a base plate marked with a series of numbers, a rotatable disk mounted upon said base plate and having a series of numbers marked around same corresponding to the numbers upon the base plate, said disk having an annular series of numbered holes formed therein, a star wheel engaging in said holes, and a projecting part carried by the base plate adapted to engage with said starwheel once every revolution of the disk, so as to cause same to engage with the next adjacent hole.

4. A calculating machine comprising a base plate marked with a series of numbers, a rotatable disk mounted upon said base plate and having a series of numbers marked around same corresponding to the numbers upon the base plate, said disk having an annular series of numbered holes formed therein, a star wheel engaging in said holes, a movable radial bar carrying said wheel at its outer end, and a projecting part carried by the base plate and adapted to engage with said star-wheel once upon every revolution of the disk, so as to cause same to engage with the next adjacent hole.

5. A calculating machine comprising a base plate marked with a series of numbers, a rotatable disk mounted upon said base plate and having a series of numbers marked around same corresponding to the numbers upon the base plate, said disk having an annular series of numbered holes formed therein, a star-wheel engaging in said holes, a movable radial bar carrying said wheel at its outer end, a plate carried by the edge of the base plate extending over the edge of the disk, said plate having an aperture arranged to expose therethrough one of the figures on the disk, and a projecting tongue at the outer end of said plate adapted to engage with said star-wheel once every revolution of the disk, so as to cause same to engage with the next adjacent hole, the parts operating as described.

6. A calculating machine comprising a base plate marked with a series of numbers around its edge, a rotatable disk pivotally mounted upon said base plate, so that said numbers on the latter come outside the periphery of said disk, the latter having its edge portion formed with a series of notches corresponding to the numbers upon the base plate, a series of numbers upon said disk opposite to said notches, said disk having a series of numbered holes formed therein, a star-wheel engaging with said holes, and a projecting part carried by the edge of the base plate adapted to engage with said star-wheel once every revolution of the disk, so as to cause same to engage with the next adjacent hole, the parts operating as described.

7. A calculating machine comprising a base plate marked with a series of numbers around a raised outer edge, a rotatable disk pivotally mounted upon said base plate, so that said numbers on the latter come outside the periphery of said disk, the latter having its edge portion formed with a series of notches corresponding to the numbers upon the base plate, a series of numbers upon said disk opposite to said notches, said disk having also an annular series of holes formed therein, a star-wheel engaging in said holes, a movable radial bar carrying said wheel at its outer end, a plate carried by the edge of the base plate extending over the edge of the disk, an aperture in said plate arranged to expose therethrough one of the figures on the disk, and a projecting tongue at the outer end of said plate adapted to engage with said star-wheel once every revolution of the disk, so as to cause same to engage with the next adjacent hole, the parts being arranged and operating as described.

8. A calculating machine comprising a base plate marked with a series of numbers around its edge, a rotatable disk mounted upon said base plate and having a series of numbers marked around same corresponding to the numbers upon the base plate, said disk having an annular series of holes formed therein, a star-wheel engaging in said holes, a movable radial bar of spring construction carrying said wheel at its outer end, and serving to maintain said wheel in full engagement with said holes, and a projecting part carried by the base plate adapted to engage with said star-wheel once every revolution of the disk so as to cause same to engage with the next adjacent hole, the parts operating as described.

9. A calculating machine comprising a base plate marked with a series of numbers around a raised outer edge, a rotatable disk pivotally mounted upon said base plate, so that said numbers on the latter come outside the periphery of said disk, the latter having its edge portion formed with a series of notches corresponding to the numbers upon the base plate, said disk also having a series of numbers marked thereon opposite to said notches, and an annular series of numbered holes formed therein, a star-wheel engaging in said holes, a rotatable and transversely-corrugated radial bar of spring construction pivoted at the center of the disk, and carrying said wheel at its outer end, a plate carried by the edge of the base plate extending over the edge of the disk, said plate having an aperture, arranged to expose therethrough one of the numbers on the disk, and a projecting tongue at the outer end of said plate adapted to engage with said star-wheel once every revolution of the disk, so as to cause same to engage with the next adjacent hole, the whole operating as described.

10. A calculating machine comprising a base plate marked with a series of numbers around a raised outer edge, a rotatable disk pivotally mounted upon said base plate, so that said numbers on the latter come outside the periphery of said disk, the latter having its edge portion formed with a series of notches corresponding to the numbers upon the base plate, said disk also having a series of numbers marked thereon opposite to said notches and an annular series of holes formed therein opposite and corresponding to, and upon the inner side of, said numbers, a star-wheel engaging in said holes, a rotatable and transversely-corrugated radial bar of spring construction pivoted at the center of the disk and carrying said star-wheel at its outer end, a plate carried by the edge of the base plate extending over the edge of the disk, said plate having an aperture arranged to expose the number on the disk thereunder, said plate having also a gap or recess at one side plate immediately over the zero mark of the base thereof, and a projecting tongue at the outer end of said plate adapted to engage with said star-wheel once every revolution of the disk, so as to cause same to engage with the next adjacent hole, the parts being arranged and operating as described and set forth.

In testimony whereof we have hereunto set our hands in presence of two subscribing witnesses.

ARMAND ALBERT ABRAHAM DREYFUS.
ALFRED HENRY VICTOR LÉVY.

Witnesses:
HENRY NORTON SKERRETT,
HARRY OSMOND PRATT.